(12) United States Patent
Wiebe et al.

(10) Patent No.: US 8,107,092 B2
(45) Date of Patent: Jan. 31, 2012

(54) METHOD AND DEVICE FOR PREPARING A PRINTOUT OF A POSITION-CODING PATTERN

(75) Inventors: Linus Wiebe, Lund (SE); Petter Ericson, Malmö (SE)

(73) Assignee: Anoto AB, Lund (SE)

( * ) Notice: Subject to any disclaimer, the term of this patent is extended or adjusted under 35 U.S.C. 154(b) by 60 days.

(21) Appl. No.: 12/630,377

(22) Filed: Dec. 3, 2009

(65) Prior Publication Data

US 2010/0079807 A1 Apr. 1, 2010

Related U.S. Application Data

(62) Division of application No. 10/116,068, filed on Apr. 5, 2002, now Pat. No. 7,649,637.

(60) Provisional application No. 60/283,143, filed on Apr. 12, 2001.

(51) Int. Cl.
*G06K 15/02* (2006.01)
*G06K 1/00* (2006.01)
*G06K 15/00* (2006.01)

(52) U.S. Cl. ...... 358/1.11; 358/1.9; 358/3.11; 358/1.15; 358/1.12

(58) Field of Classification Search .................. 358/1.9, 358/1.2, 1.16, 3.11, 1.15, 1.11, 1.12
See application file for complete search history.

(56) References Cited

U.S. PATENT DOCUMENTS

| | | | |
|---|---|---|---|
| 5,348,348 A | 9/1994 | Hanada et al. | |
| 5,542,050 A | 7/1996 | Onozawa | |
| 5,661,506 A | 8/1997 | Lazzouni et al. | |
| 5,852,434 A | 12/1998 | Sekendur | |
| 5,896,403 A | 4/1999 | Nagasaki et al. | |
| 6,002,847 A | 12/1999 | Silverbrook | |
| 6,014,501 A | 1/2000 | Fukuda et al. | |
| 6,106,147 A | 8/2000 | Silverbrook | |
| 6,134,695 A | 10/2000 | Sasaki et al. | |
| 6,176,427 B1 | 1/2001 | Antognini et al. | |
| 6,586,688 B2 * | 7/2003 | Wiebe ........................ | 178/18.09 |

FOREIGN PATENT DOCUMENTS

| | | |
|---|---|---|
| JP | 07-141104 | 6/1995 |
| JP | 09-152945 | 6/1997 |
| JP | 09-263009 | 10/1997 |

(Continued)

OTHER PUBLICATIONS

XP002328425: Dymetman and Copperman, Intelligent Paper, Xerox Research Center Europe; published in Apr. 1998.

(Continued)

*Primary Examiner* — Thomas Lett
(74) *Attorney, Agent, or Firm* — Finnegan, Henderson, Farabow, Garrett & Dunner LLP

(57) ABSTRACT

The invention relates to a method for generating a printout of a section of a global position-coding pattern in a system comprising a computer unit and a printer unit connected to the computer unit. The method is characterized by the steps of generating in the computer unit boundary information that describes the boundaries of the section in the global position-coding pattern; transmitting the boundary information from the computer unit to the printer unit; generating graphical information in the printer unit by means of an algorithm that defines the global position-coding pattern and on the basis of the boundary information, which graphical information describes pattern symbols in the section; and printing out the graphical information on a base by the printer unit.

17 Claims, 4 Drawing Sheets

FOREIGN PATENT DOCUMENTS

| | | |
|---|---|---|
| JP | 10-187395 | 7/1998 |
| JP | 11-301077 | 11/1999 |
| JP | 2000-115481 | 4/2000 |
| JP | 2000-211204 | 8/2000 |
| WO | WO 99/50787 | 10/1999 |
| WO | WO 00/72126 A1 | 11/2000 |
| WO | WO 00/72247 A1 | 11/2000 |
| WO | WO 00/73981 A1 | 12/2000 |
| WO | WO 01/26032 A1 | 4/2001 |
| WO | WO 01/26033 A1 | 4/2001 |
| WO | WO 01/61631 A1 | 8/2001 |
| WO | WO 01/75779 A1 | 10/2001 |

OTHER PUBLICATIONS

PCT: International Search Report for Application No. 0101208-7; Search Request No. SE 01/00448, mailed Dec. 12, 2001 (4 pages).

* cited by examiner

METHOD AND DEVICE FOR PREPARING A PRINTOUT OF A POSITION-CODING PATTERN

This is a division of Application No.10/116,608, filed Apr. 5, 2002 now U.S. Pat. No. 7,649,637 (allowed) and claims the benefit of U.S. Provisional Application Ser. No. 60/283,143, filed Apr. 12, 2001 and Swedish Application 0101208-7, filed Apr. 5, 2001, all of which are incorporated herein by reference.

TECHNICAL FIELD

This invention relates to a method for generating, in a system comprising a computer unit and a printer unit connected to the computer unit, a printout of a position-coding pattern, a system for generating a printout of a position-coding pattern, a printer device, a computer program, a digital storage medium and a printer.

BACKGROUND ART

This invention is intended to be used for the generation of position-coding patterns. A position-coding pattern is constructed of a large number of symbols which are printed on a base. By recording optically a particular minimum number of symbols with a reading device, the absolute position in the pattern of these symbols and thereby of the reading device can be detected.

Such a pattern can be used in various ways. For example, a reading device can be integrated into an ink pen that is used to write on the base. At the same time as the user writes text or draws a figure on the base, the movement of the pen over the base can be recorded as a sequence of positions. A digital copy of what the user wrote on the base is thereby created, without the use of a conventional scanner.

The position-coding pattern can be designed in a plurality of ways. It has been proposed that symbols in the form of dots of different sizes can be used, a large dot coding a "one" and a small dot coding a "zero". Such a pattern is described in WO 00/73983, which is incorporated herewith by reference. Alternatively, dots with different displacements in relation to a raster can code different symbol values. Such patterns are described in WO 01/16691, PCT/SE00/01895 and PCT/SE00/01897, which are incorporated herewith by reference.

Such a position-coding pattern can code unique positions on a very large surface with good resolution. It is calculated that 4.6 million $km^2$ can be coded with unique positions with good resolution.

In many cases, bases with a position-coding pattern can be generated on a large scale and with high precision in the graphics industry. This applies, for example, in the production of diaries or notepads. There are, however, also occasions when it is desirable to create bases with a position-coding pattern on a small scale. This can then be carried out using a personal computer, to which a printer of for example, the ink-jet or laser type, has been connected.

This can be carried out in such a way that the required part of the position-coding pattern is created as a file in a graphical format, for example, in bmp format (bmp=bitmap). This graphical file is converted into a page-describing and normally printer-independent code, such as POSTSCRIPT (trademark), after which it is transmitted to the printer unit. On the basis of the page-describing code, the printer unit creates corresponding information which is used to control the printer's hardware. This hardware can, in the case of a laser printer, comprise a laser diode with associated optics. Where the printer is an ink-jet printer, the hardware comprises an ink ejector. The printout is then carried out on a base, for example a sheet of paper.

A problem associated with this method is that in the resultant printout the system introduces something that could be called "noise". This noise arises as a result of, among other things, quantizing, and results in small displacements and/or deformations of the symbols in the position-coding pattern. The quantizing arises when the graphical file is adapted to the page-describing code and/or when the page-describing code is adapted to the printer's hardware and software.

When printing out graphical files that describe other than position-coding patterns, for example images intended to be visible to the human eye, this does not normally cause problems. Small displacements or deformations of small elements in an image are not generally detected.

For a reading device of the above-mentioned type, which is intended to detect positions in a position-coding pattern, however, such displacements or deformations of the symbols in the pattern can cause problems, in that the reading device detects an incorrect or invalid position. This can occur if the resolution of the position-coding pattern is too high in relation to the performance of the printer and the quality (for example, the smoothness of the surface) of the base.

SUMMARY OF THE INVENTION

An object of this invention is to solve the above-mentioned problems completely or partially.

This object is achieved by a method for generating, in a system comprising a computer unit and a printer unit connected to the computer unit, a printout of a position-coding pattern, a system for generating a printout of a position-coding pattern, a printer device, a computer program, a digital storage medium and a printer.

According to a first aspect of the invention, this relates to a method for generating, in a system comprising a computer unit and a printer unit connected to the computer unit, a printout of at least one section of a global position-coding pattern. The method is characterized by the step of generating in the computer unit boundary information that describes the section's boundaries in the global position-coding pattern; transmitting the boundary information from the computer unit to the printer unit; generating graphical information in the printer unit by means of an algorithm that defines the global position-coding pattern and on the basis of the boundary information, which graphical information describes the pattern symbols in the section; and printing out the graphical information on a base by means of the printer unit. This makes it possible to adapt the printed-out pattern to suit the properties of the printer, which makes it possible to print out position-coding patterns with greater precision.

According to a preferred embodiment, the method further comprises the step of transmitting the algorithm from the computer unit to the printer unit. This makes possible the printout of a pattern generated in the printer unit even though the printer unit is not specially equipped to print out such patterns.

Preferably, a plurality of sections, which can originate from separate parts of the global position-coding pattern, can be printed out on one and the same base. For this, several sets of boundary information are transmitted from the computer unit to the printer unit. This makes possible the printout of more complex pattern compositions.

The pattern symbols can preferably consist of dots. This makes possible the printout of patterns with very high resolution.

The computer unit preferably transmits a required pattern quality specification to the printer unit, whereby the printer unit using the algorithm adapts a set of printer parameters (for example dot size) on the basis of the pattern quality specification. This makes possible printer-independent printout of position-coding patterns with higher quality. A pattern with good quality can be generated autonomously. The printer unit can be provided with optical equipment that monitors the quality of the printed-out pattern and controls the parameters accordingly until the quality specification is attained.

In a preferred embodiment, the algorithm is so constituted that the distances between the pattern symbols in the graphical information are dependent upon a printer parameter. This can be used to eliminate completely or partially quantizing noise that arises if the printer does not have a relatively high resolution.

According to a preferred embodiment, the algorithm is so constituted that the pattern symbols in the graphical information are displaced relative to each other by whole multiples of the printer unit's smallest possible symbol displacement. This provides an optimal pattern at a given resolution of the printer unit.

For a printout where a position-coding pattern's scale is adjusted in relation to an ideal pattern, the printer unit is preferably arranged also to adjust the scale of the printed-out information that does not constitute the position-coding pattern. This provides better printouts when the mutual relationship between positions in a position-coding pattern and positions in other types of printout is important.

The algorithm is preferably so constituted that the size of the pattern symbols in the graphical information depends upon a parameter which is specific to the printer. This provides printed-out position-coding patterns with higher quality.

According to a preferred embodiment, the algorithm is so constituted that the intensity of the pattern symbols in the graphical information depends upon a parameter which is specific to the printer. This provides printed-out position-coding patterns with higher quality.

The printer unit preferably operates when printing out at a printout speed that is reduced in comparison to the printer's maximum printout speed. This provides printed-out position-coding patterns with higher quality.

If a section of a position-coding pattern is the shape of a planar curve, the corresponding boundary information comprises preferably a parameter representation of this curve. This makes it possible to describe a section of a position-coding pattern in a simple way.

According to an embodiment of the invention, at least one section is the shape of a rectangle, where corresponding boundary information comprises at least positions in the position-coding pattern for two diagonally opposite corners of the rectangle. This makes it possible to describe a section of a position-coding pattern in a simple way.

According to an embodiment of the invention, at least one section is the shape of a polygon, where corresponding boundary information comprises at least positions in the position-coding pattern for corners of the polygon. This makes it possible to describe a section of a position-coding pattern in a simple way.

According to an embodiment of the invention, at least one section is the shape of a circle, where corresponding boundary information comprises at least the position in the position-coding pattern for the center of the circle and a piece of information concerning the diameter of the circle. This makes it possible to describe a section of a position-coding pattern in a simple way.

According to an embodiment of the invention, at least one section is the shape of an ellipse, where corresponding boundary information comprises at least positions in the position-coding pattern for the foci of the ellipse and a piece of information concerning the total distance between the one hand each of the foci and, on the other hand, a given point on the periphery of the ellipse. This makes it possible to describe a section of a position-coding pattern in a simple way.

According to a second aspect of the invention, this relates to a system comprising a computer unit and a printer unit connected to the computer unit, for generating a printout of at least one section of a global position-coding pattern. The system is characterized by means in the computer unit for generating boundary information, that describes the boundaries of the section in the global position-coding pattern; means for transmitting the boundary information from the computer unit to the printer unit; means in the printer unit for generating graphical information using an algorithm that defines the global position-coding pattern and on the basis of the boundary information, which graphical information describes the pattern symbols in said section; and means in the printer unit for printing out said graphical information on a base. This system has advantages corresponding to those of the method and can be varied in a corresponding way.

According to a third aspect of the invention, this relates to a printer device for generating a printout of at least one section of a global position-coding pattern, the printer device being intended to be connected to a computer unit. The printer device is characterized by means for receiving boundary information from the computer unit, which boundary information describes the boundaries of the section in the global position-coding pattern; means for generating graphical information, using an algorithm that defines the global position-coding pattern and on the basis of the boundary information, which graphical information describes pattern symbols in said section; and means for printing out said graphical za information on a base. This device has advantages corresponding to those of the method and can be varied in a corresponding way.

Graphical information corresponding to a position-coding pattern is preferably printed out in the printer device using an ink that absorbs infrared light, and other graphical information is printed out using an ink that does not absorb infrared light. This makes it possible to detect the position-coding pattern using infrared light without other graphical information such a text or figures on the same sheet of paper causing interference.

Preferably, the ink that absorbs infrared light is a carbon-based ink which is reserved for the position-coding pattern.

According to a preferred embodiment, the printer unit comprises a paper tray intended for sheets of paper adapted for printout of position-coding patterns. This makes possible in a simple way the use of sheets of paper of high quality for the printout of position-coding patterns.

According to a fourth aspect of the invention, this relates to a computer program intended to generate a printout of at least one section of a global position-coding pattern in a system comprising a computer unit and a printer unit connected to the computer unit. The computer program is characterized by instructions corresponding to the step of generating boundary information that describes the boundaries of the section in the global position-coding pattern; transmitting the boundary information from the computer unit to the printer unit, the printer unit being intended to generate graphical information using an algorithm that defines the global position-coding pattern and on the basis of the boundary information, which graphical information describes pattern symbols in said section, and to print out said graphical information on a base. This program has advantages corresponding to those of the method and can be varied in a corresponding way.

According to a fifth aspect of the invention, this relates to a digital storage medium, containing such a computer program.

According to a sixth aspect of the invention, this relates to a printer for printing out visual information where the printer is intended to be connected to a computer unit. The printer is characterized by an operating means, such as a button, which is arranged on the printer. Activation of the operating means activates an algorithm in the printer, which algorithm generates graphical information corresponding to a position-coding pattern, this graphical information being superimposed on said visual information during printing out. This makes possible the addition of a position-coding pattern to any graphical or text document.

According to a preferred embodiment, the printer is arranged to obtain boundary information from a computer system connected to the printer, which boundary information is used by said algorithm. Using such a system it can be guaranteed that a position-coding pattern that is unique to a group of users is printed out by the printer unit.

DESCRIPTION OF PREFERRED EMBODIMENTS

Figure 1:
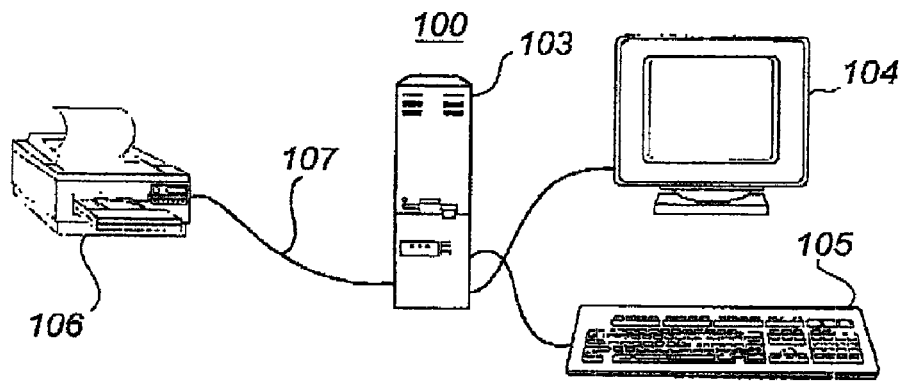
FIG. 1 shows a system in which this invention can be used.

FIG. 1 shows a system 100 in which this invention can be used. The system comprises a computer unit, such as a personal computer 103, which has a monitor 104 and a keyboard 105 in the normal way. The personal computer 103 is connected to a printer unit 106 by means of, for example, a cable 107. The system is used to print out a position-coding pattern on a sheet of paper. At the same time as the position-coding pattern is printed out, other information can be printed out on the sheet of paper.

Figure 2:
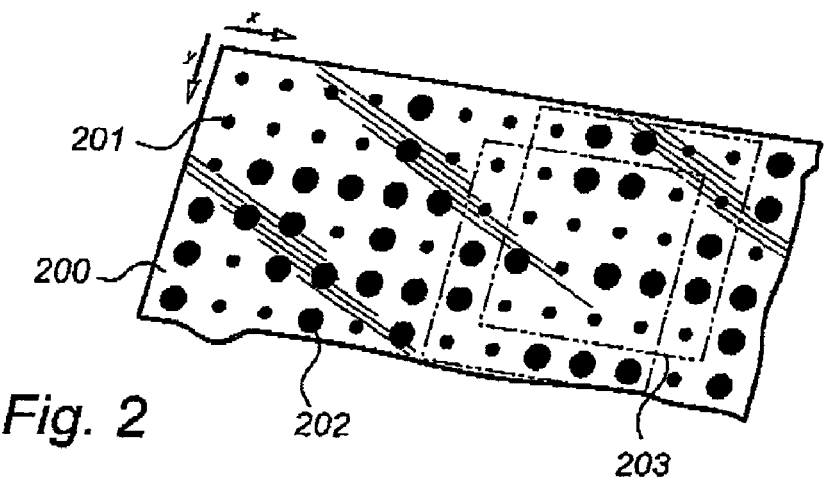
FIG. 2 shows a position-coding pattern of a first type.

FIG. 2 shows a position-coding pattern of a first type, which is printed on a sheet of paper 200. In this pattern, dots of different sizes are used to code different symbol values. For example, a large dot 202 can code a logical "one" and a small dot 201 can code a logical "zero". By optically detecting symbol values within an area 203 of a certain minimum size, the position of the area in the total pattern and thus on the sheet of paper 200 can be determined unambiguously.

This can, for example, be used in a drawing device (not shown) in the form of a pen provided with an optical detector. The drawing device can be used to write, for example, text on the sheet of paper. At the same time, the optical detector records a sequence of positions on the sheet of paper, by taking images at regular intervals of the pattern that is located under the drawing device. This sequence of positions constitutes a digital copy of the text that was written on the sheet of paper.

Figure 3:
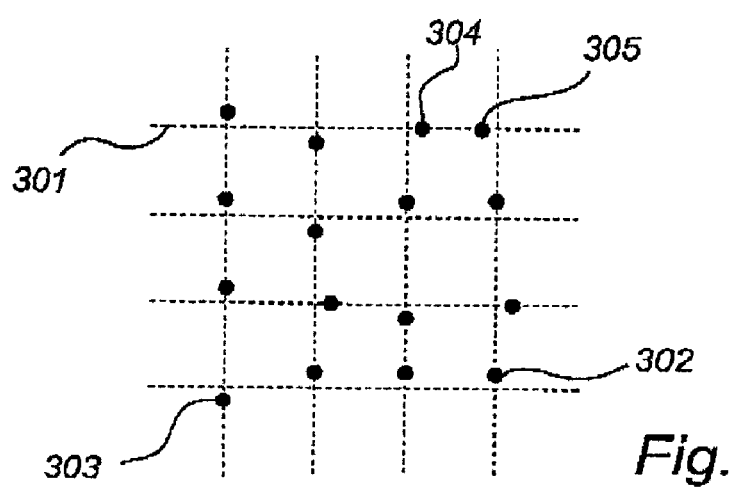
FIG. 3 shows a position-coding pattern of a second type.

FIG. 3 shows a position-coding pattern of a second type. In this case, different displacements of dots in relation to a raster pattern code different symbol values. The raster pattern consists of vertical and horizontal lines 301. In the actual application, however, the raster pattern does not need to be printed out. The symbol value of a dot can also be determined using other dots in the pattern. As shown in FIG. 3 there are dots above, below, to the right and to the left of a corresponding raster position (that is an intersection between a vertical and a horizontal line), for which reason there are four different symbol values in this pattern. This pattern can be used in a similar way to the pattern in FIG. 2.

The distance between two adjacent raster positions in the pattern in FIG. 3 can in an example be 300 µm. The dots can be displaced 50 µm from the respective raster positions. This gives a minimum distance between two adjacent dots (the left-hand one displaced to the right, the right-hand one displaced to the left) of 200 µm. The next smallest distance between two dots (for example, the left-hand dot displaced to the right, the right-hand dot displaced upwards) is 255 µm, given that all dots are displaced relative to their respective raster positions. The difference between the smallest and the next smallest distance becomes less if the displacements from the raster positions are made larger or the distances between the raster positions are reduced, which, if the difference is too small, results in less reliable detection.

Figure 4:
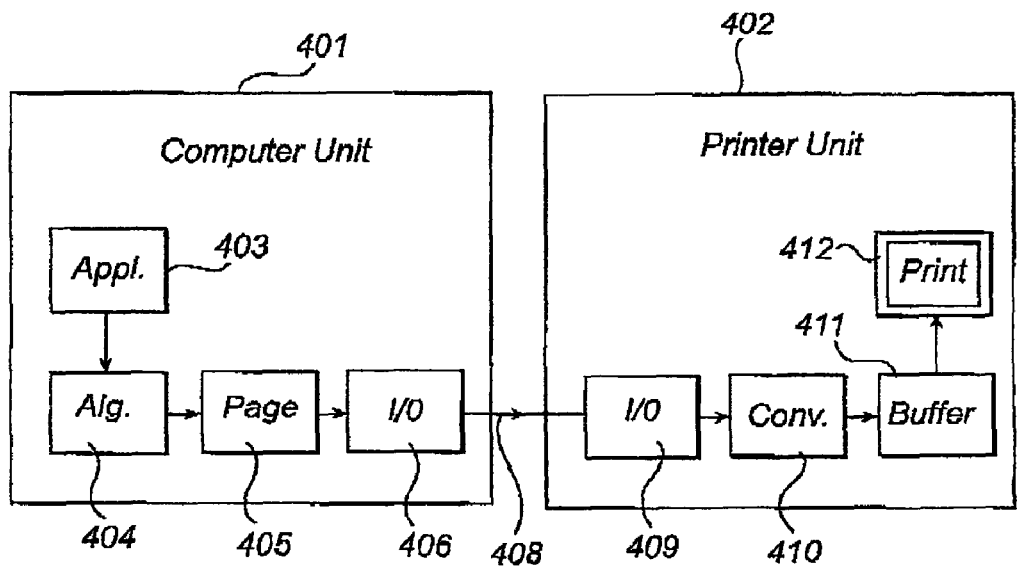
FIG. 4 shows in block diagram form an arrangement for printing out a position-coding pattern.

FIG. 4 shows a printout arrangement in block diagram form. The arrangement is of conventional type. There is a computer unit 401 and a printer unit 402. These are connected by a cable 408. An application 403 is active in the computer. If the application 403 initiates a printout of a position-coding pattern, instructions are sent concerning this to a module 404 for generation of the position-coding pattern. This generates a wholly or partly graphical file, for example in .gif-, .jpeg, .bmp-, .pdf- or .tiff-format. This file can be said to contain an ideal pattern. The graphical file is sent to a conversion module 405 which in a known way converts the graphical format into a page-describing code, for example in POSTSCRIPT™ format or in a PCL—(Printer Control Language)-format. Using an I/O (input-output) module 406 in the computer unit 401, the page-describing code is transmitted via the cable 408 to a corresponding I/O module 409 in the printer unit 402. The page-describing code is then forwarded to a conversion module 410, which converts it into graphical information, which constitutes the input data for the printer's hardware 412. This graphical information is entered in a buffer memory 411, from which it is read by the printer hardware 412. On the basis of the graphical information, the printer hardware 412 generates a printout on a sheet of paper, for example.

Figure 5:
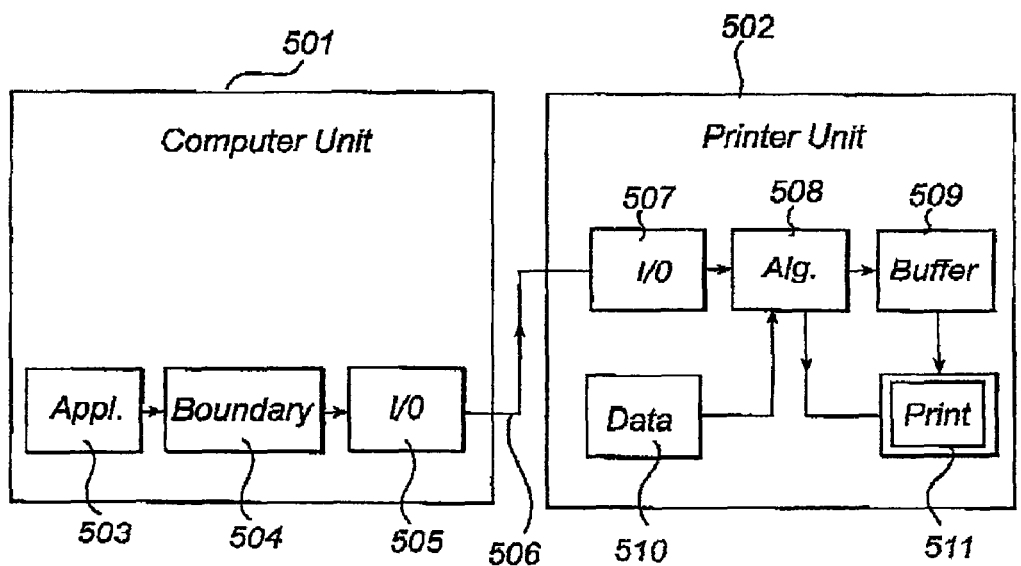
FIG. 5 shows in block diagram form an arrangement for printing out a position-coding pattern according to an embodiment of the invention.

FIG. 5 shows in block diagram form an arrangement for printing out a position-coding pattern according to an embodiment of the invention. The arrangement comprises a computer unit 501 and a printer unit 502. An application 503 is running in the computer unit 501. The application initiates here a printout of a section of a position-coding pattern by sending instructions to a boundary module 504. The boundary module 504 then generates information regarding the boundaries of the section in a larger global position-coding pattern. The boundary module 504 can also generate information regarding the ideal resolution and ideal density of this section. The information that is generated by the boundary module 504 is transmitted to the printer unit 502 via, for example, a cable 506 and using an I/O module 505. It is recognized that the transmission can be carried out by other means, such as an infrared link or a short-range radio link. The transmitted information is received by an I/O module 507 in the printer unit 502 and forwarded to an algorithm module 508 in the printer unit. The algorithm module 508 generates graphical information on the basis of information from the boundary module 504 in the computer unit 501, which graphical information describes pattern symbols in the section of the global position-coding pattern. As the algorithm module 508 has access to data 510 regarding the properties of the printer, such as resolution, ink type, etc, optimal graphical information describing pattern symbols can be generated and entered in a buffer memory 509. As a result, problems which will be described in greater detail below, are completely or partially avoided. In addition, the transmission from the computer unit to the printer unit takes place more rapidly, since less information needs to be transmitted, as the pattern is generated in the printer unit.

As in the arrangement in FIG. 4, printer hardware 511 in the printer unit 502 generates a printout on the basis of the information in the buffer memory 509. The position-coding pattern is preferably printed out using an ink that absorbs infrared light, and other graphical information using an ink that does not absorb infrared light. For example, in an ink-jet printer the position-coding pattern can be printed out using a carbon-based black ink, while other information can be printed out using a RGB (Red, Green, Blue) combination (or CMY combination), which also may produce a black ink that does not absorb infrared light. This can be carried out using ink cartridges found in many ink-jet printers and makes it possible for the position-coding pattern to be detected using infrared light without other graphical information such as text or figures on the same sheet of paper causing interference. Some printers, having the capability to use both carbon-based black ink and ROB-ink for producing graphics, automatically chooses the carbon-based ink option for all black graphics. In a preferred embodiment of the invention, this automatic feature is blocked when graphics containing a position-coding pattern is generated, so that the carbon-based ink is reserved for the position-coding pattern only, and the RGB-option is used for other black graphics.

The printer unit can comprise a paper tray intended for sheets of paper adapted for the printout of position-coding patterns. If a printout comprises a position-coding pattern, the printer automatically selects paper from this tray. This makes possible in a simple way the use of sheets of paper of high quality for the printout of position-coding patterns.

A printer arrangement as shown in FIG. 5 can of course comprise modules for printing out other information than position-coding patterns in the normal way. The arrangement can therefore also comprise modules for generating and translating a page-describing code, which work completely or partially in parallel with and independently of the arrangement in FIG. 5. Where the other information comprises parts that have a critical position on the sheet of paper relative to the position-coding pattern, these parts can, however, also be adapted to the position-coding pattern.

The algorithm module 50B can be constructed in a plurality of different ways. It can consist of a system that calculates mathematically the appearance of the pattern based on the boundary information. It is also possible to have the algorithm module 50B comprise a memory that contains information concerning the appearance of a larger or smaller part of the position-coding pattern.

In general, the modules shown in FIG. 5 can comprise both hardware and software.

In principle, it is possible to obtain boundary information from other sources than the computer unit that prints out other visual information (for example text, a figure, a table or the like) on the printer. The printer can then have an operating means, such as a button. Activating the operating device activates the printer's algorithm (optionally this can be permanently activated), which without this having been initiated by the computer unit generates graphical information corresponding to a position-coding pattern. This graphical information is superimposed on the visual information during the printout. The printer can then preferably be arranged to obtain boundary information from a computer system connected to the printer, which computer system can be other than the above-mentioned computer unit. The boundary information is used by the algorithm in the printer. This permits a locally unique pattern, unique within a group of users, (for example at a workplace) to be used for the printout, which avoids the danger of a "collision" in the pattern during digital recording which is carried out by means of the pattern.

Figure 6:
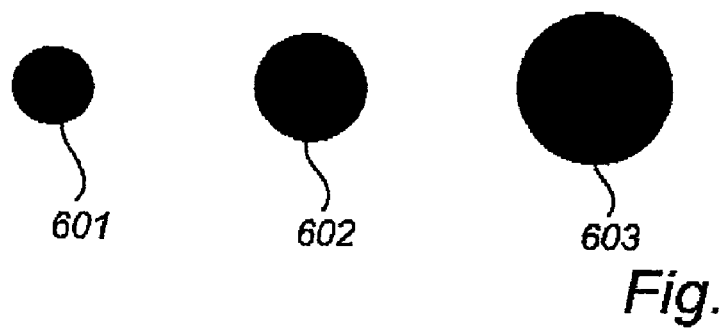
FIG. 6 illustrates a problem with quantizing of symbol size.

FIG. 6 illustrates a problem with quantizing of symbol size. A printer unit cannot necessarily generate a dot of any size. It is normal for a printer to generate a number of different dot sizes, which are adapted to the printer's hardware. The dots 601, 602 and 603 are examples of such dot sizes. If the printout of a position-coding pattern is carried out using a conventional arrangement such as the one in FIG. 4, there is a danger that the required ideal symbol size, that is preferably the dot size, does not correspond with the sizes that can be generated by the printer. Normally, during conversion of the page-describing code, these dots are replaced by dots of the size that is closest, that is the size of the dots is quantized.

Assume that a pattern of the type shown in FIG. 2 is to be printed out. The larger ideal dot 202 is a size that lies between the sizes of the dots 602 and 603. The smaller ideal dot type 201 is a size that lies between the sizes of the dots 601 and 602. In a worst case scenario, the printer unit will print out both the large and the small dots in the ideal pattern the same size as dot 602. All the symbols in such a pattern will have the same symbol value and such a pattern will, of course, be unusable.

Quantizing of dot size can also cause problems in patterns of the type shown in FIG. 3. If the dots are made too large in a pattern with high resolution, they can join together, which can make optical detection of positions in the pattern impossible.

If instead the printout is carried out with an arrangement according to the invention, such as the one shown in FIG. 5, the pattern of the algorithm module 508 can be adapted to suit the properties of the printer. In the example with the pattern in FIG. 2, dots of the type 601 can, for example, be chosen to represent small dots and dots of the type 602 can be chosen to represent large dots.

Figure 7:
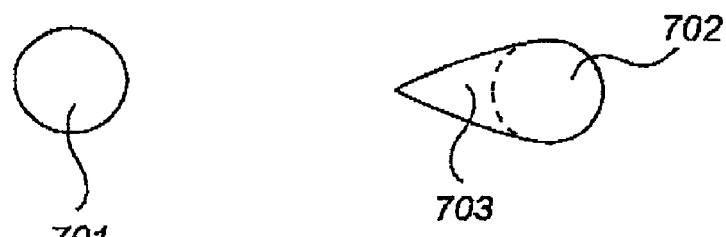
FIG. 7 illustrates a problem with rapid printout in ink-jet printers.

FIG. 7 illustrates a problem with printing out on ink-jet printers. The problem arises during rapid printing, when the printer head moves comparatively quickly in relation to a sheet of paper. The problem reveals itself as a "tail" 702 behind a dot 701. The dot is therefore deformed, which can result in incorrect or omitted optical detection of a position in a position-coding pattern. In an arrangement according to an embodiment of the invention, this can be avoided by reducing the print speed when printing out position-coding patterns. This is shown in FIG. 5 where the algorithm module 508 causes the printer hardware 511 to reduce the print speed.

Figure 8:
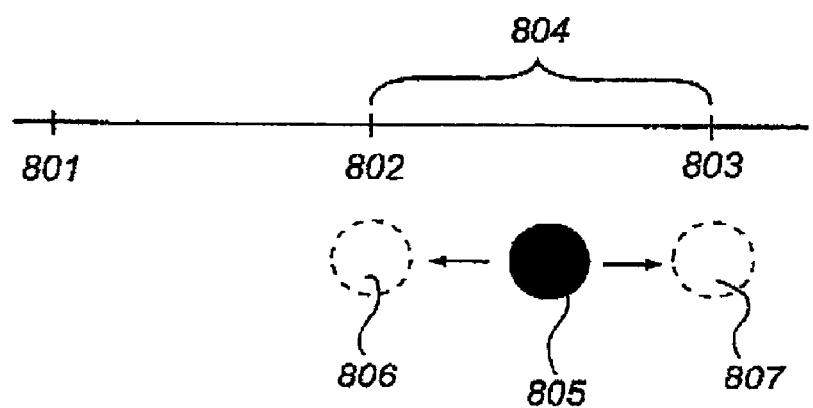
FIG. 8 illustrates a problem with quantizing of symbol displacement distances.

FIG. 8 illustrates a problem with quantizing of symbol displacement distances. The resolution in printout varies from printer to printer. Analogous with this, the smallest possible distance that a dot, for example in a position-coding pattern, can be displaced varies. In a printer with a resolution of 800 dpi (dots per inch) the least distance a dot can be displaced is eight hundredths of an inch. This imposes a restriction on the printout. In FIG. 8, a number of positions 801, 802, 803 are shown along an axis, at which positions a dot can be placed. The distance 804 between them is the least symbol displacement distance of the printer.

If a dot should ideally be placed at a position 805 between the above-mentioned positions, the printer will displace this to any of the possible positions, cf. 806, 807, when printing out. This involves a quantizing of the symbol position. It is obvious that such displacements of the symbol position can cause problems when printing out a position-coding pattern such as the one shown in FIG. 3. This is both because a symbol can be given an incorrect position in relation to its raster position, and also because the raster position that is calculated using other dots in an image of the pattern will be calculated incorrectly. It cannot be assumed that the displacement is identical for all the dots in the pattern.

If instead the printout is carried out with an arrangement according to the invention, such as the one shown in FIG. 5, the pattern of the algorithm module 508 can be adapted to suit the properties of the printer. In the example with the pattern in FIG. 3, the distances between the raster positions and the displacements of the dots in relation to the respective raster position can be whole multiples of the printer's smallest possible symbol displacement, which will permit the printout of a useable pattern.

In an example, a printer is used with the resolution 600 dpi (which gives a minimum displacement b=42.33 µm). An ideal pattern of the type shown in FIG. 3 is to be printed out. In the example, this is ideally 300 µm between the raster positions and 50 µm displacement of the dots in relation to the raster positions. Printing out in the conventional way in accordance with FIG. 4 results, as mentioned, in uneven displacements of the pattern symbols, which, in addition to resulting in the danger of incorrect position detection, produces an interference pattern in the printout that is annoying to the eye.

By adapting the printout to the properties of the printer, the printout can be improved. The boundary information can comprise or be accompanied by information defining within what limits the pattern can be changed, but such information can also be stored in the printer unit. For example, the displacement of a dot can preferably lies within the range one eighth to one quarter of the distance between two raster positions. If the printer's resolution is good, as a rule there are many possible combinations for the choice of raster position distance and dot displacement distance. Preferably the solutions are then selected that deviate least from the ideal required pattern.

In an embodiment, the distance between the raster positions can be changed to 254 µm (6·b) (unchanged dot displacement). This adjustment alone produces a better pattern with considerably less interference pattern.

In another embodiment, both the distance between the raster positions and the displacement distance are changed. The distance between the raster positions can be changed to 296.33 µm (7·b) and the displacement distance to 42.33 µm (b). This provides a perfect pattern, completely without interference. Another alternative can be to change the distance between the raster positions to 254 µm (6·b) and the displacement distance to 42.33 µm (b). Note that even a small adjustment of the raster position distance and the dot displacement distance from the required distances can have a positive effect on the printed-out position-coding pattern.

In those cases where the displacement distances are adjusted downwards, it can be advantageous to reduce the dot size if necessary, so that the dot does not cover its raster position.

Figure 9:
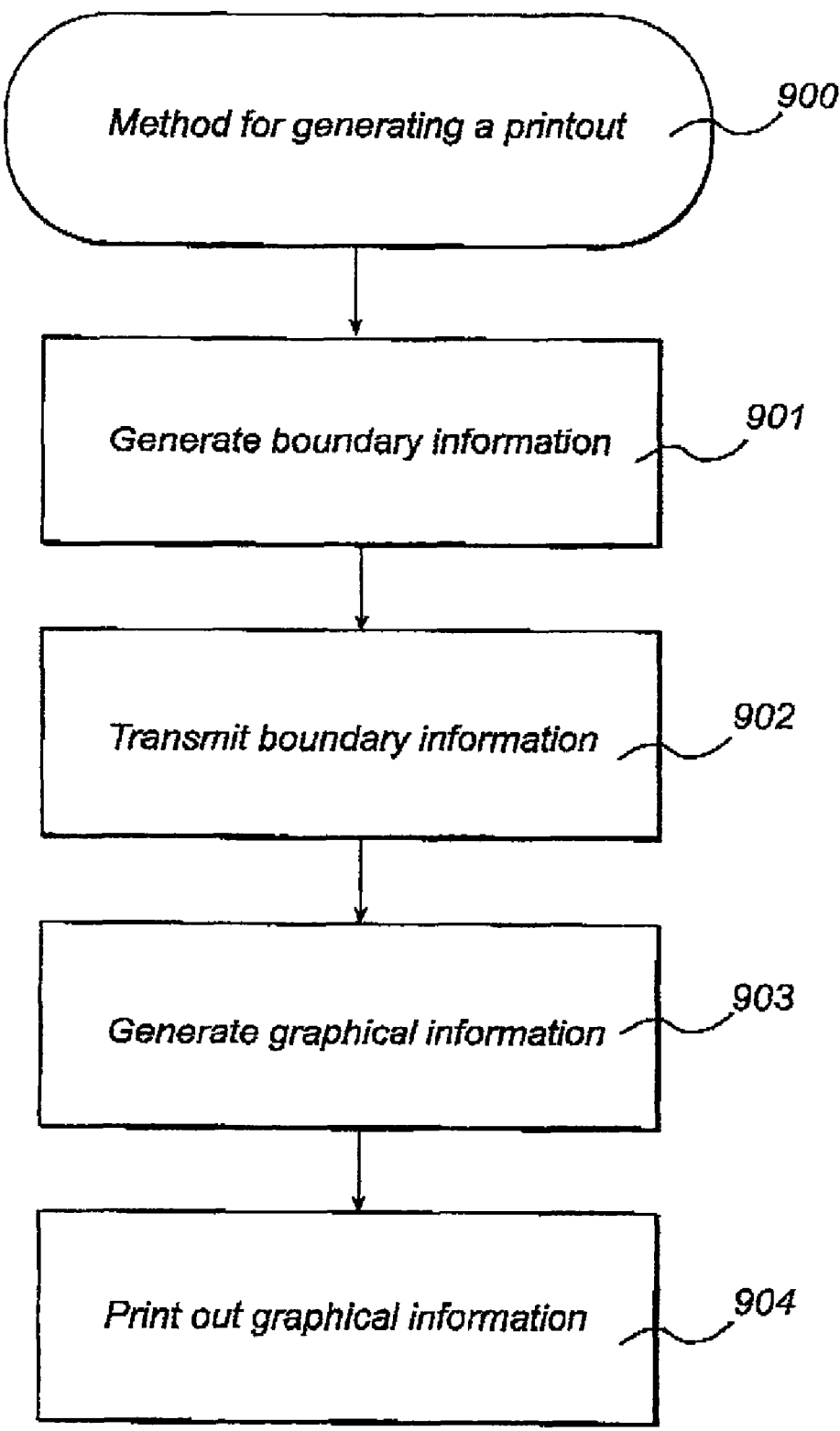
FIG. 9 shows a flow chart for a method according to an embodiment of the invention.

FIG. 9 shows a flow chart for a method 900 according to an embodiment of the invention.

In a first step 901 boundary information is generated in the computer unit, which boundary information describes the boundaries of a section in a global position-coding pattern.

If a section is the shape of a planar curve, the boundary information can comprise a parameter representation of this curve.

If the section is the shape of a rectangle, corresponding boundary information can comprise positions in the position-coding pattern for two diagonally opposite corners of the rectangle.

If the section is the shape of a polygon, corresponding boundary information can comprise positions in the position-coding pattern for corners of the polygon. The polygon does not need to be equilateral, but if it is equilateral or symmetrical in some other way, it is often sufficient to have a smaller number of position indications than the number of corners of the polygon.

If the section is the shape of a circle, corresponding boundary information can comprise the position in the position-coding pattern for the center of the circle and a piece of information concerning the diameter of the circle.

If the section is the shape of an ellipse, corresponding boundary information can comprise positions in the position-coding pattern for the foci of the ellipse and a piece of information concerning the total distance between, on the one hand, each of the foci and, on the other hand, a given point on the periphery of the ellipse.

In a second step 902, boundary information is trans-mitted from the computer unit to the printer unit. Together with the boundary information, information concerning other properties of the pattern can be transmitted, for example dot size.

Several sections can be printed out on one and the same base. For this, several sets of boundary information are transmitted from the computer unit to the printer unit. The different sections can originate from separate parts of the global position-coding pattern.

A third step 903 generates graphical information in the printer unit by means of an algorithm which defines the global position-coding pattern and on the basis of the boundary information, which graphical information describes pattern symbols in the section. Optionally, the algorithm can also be transmitted from the computer unit to the printer. The algorithm can then be written in a page-describing code.

In a fourth step 904, the graphical information is printed out by the printer unit on a base.

The invention is not restricted to the embodiments described above, but can be varied, within the scope of the appended claims.

We claim:

1. A computerized method of preparing a printout of graphical information defining pattern symbols of a position-coding pattern in a processor, the method comprising:
   accounting, by the processor, for properties of a printer on which the graphical information is to be printed;
   modifying, by the processor, the position-coding pattern based on the accounted for printer properties to thereby adjust the graphical information for printing on the printer; and
   generating, by the processor, the graphical information defining the pattern symbols of the position-coding pattern.

2. The method of claim 1, wherein the pattern symbols are dots.

3. The method of claim 1, wherein the modifying comprises adjusting the distances between the pattern symbols in the position-coding pattern.

4. The method of claim 1, wherein the accounted-for printer properties include a smallest possible symbol displacement, and wherein the modifying comprises adjusting a displacement of the pattern symbols of the position-coding pattern such that the pattern symbols are displaced relative to each other by essentially whole multiples of the smallest possible symbol displacement.

5. The method of claim 1, wherein the modifying comprises adjusting a scale of the position-coding pattern in relation to an ideal pattern.

6. The method of claim 5, further comprising adjusting the scale of printable information that does not constitute a position-coding pattern.

7. The method of claim 1, wherein the modifying comprises adjusting a size of the pattern symbols of the position-coding pattern.

8. The method of claim 1, wherein the modifying comprises adjusting an intensity of the pattern symbols of the position-coding pattern.

9. A computing device for preparing a printout of a position-coding pattern, the device comprising:
an algorithm module arranged to generate graphical information describing pattern symbols of the position-coding pattern, and adapt the position-coding pattern to suit properties of a printer unit, on which the graphical information is to be printed.

10. A non-transitory computer-readable storage medium containing a set of instructions for performing a method of preparing a printout of graphical information defining pattern symbols of a position-coding pattern, the set of instructions when executed by a processor implement a method comprising:

accounting for properties of a printer on which the graphical information is to be printed;
modifying the position-coding pattern based on the accounted-for printer properties to thereby adjust the graphical information for printing on the printer; and
generating the graphical information defining the pattern symbols of the position coding pattern.

11. The computer-readable storage medium of claim 10, wherein the pattern symbols are dots.

12. The computer-readable storage medium of claim 10, wherein the modifying comprises adjusting the distances between the pattern symbols in the position-coding pattern.

13. The computer-readable storage medium of claim 10, wherein the accounted-for printer properties include a smallest possible symbol displacement, and wherein the modifying comprises adjusting a displacement of the pattern symbols of the position-coding pattern such that the pattern symbols are displaced relative to each other by essentially whole multiples of the smallest possible symbol displacement.

14. The computer-readable storage medium of claim 10, wherein the modifying comprises adjusting a scale of the position-coding pattern in relation to an ideal pattern.

15. The computer-readable storage medium of claim 14, further comprising adjusting the scale of printable information that does not constitute a position-coding pattern.

16. The computer-readable storage medium of claim 10, wherein the modifying comprises adjusting a size of the pattern symbols of the position-coding pattern.

17. The computer-readable storage medium of claim 10, wherein the modifying comprises adjusting an intensity of the pattern symbols of the position-coding pattern.

* * * * *

UNITED STATES PATENT AND TRADEMARK OFFICE
CERTIFICATE OF CORRECTION

PATENT NO. : 8,107,092 B2
APPLICATION NO. : 12/630377
DATED : January 31, 2012
INVENTOR(S) : Wiebe et al.

Page 1 of 1

It is certified that error appears in the above-identified patent and that said Letters Patent is hereby corrected as shown below:

On Title page, add item [30]:

--[30]  Foreign Application Priority Data

April 5, 2001  (SE) .............................. 0101208--.

Claim 1, col. 10, line 60, replace "accounted for" with --accounted-for--.

Signed and Sealed this
Nineteenth Day of June, 2012

David J. Kappos
*Director of the United States Patent and Trademark Office*